United States Patent [19]

Counsell et al.

[11] 4,061,825
[45] Dec. 6, 1977

[54] WATER ACTIVATABLE TAPES

[75] Inventors: Patrick James Claude Counsell; Sydney Robert Whitehouse, both of Stafford, Great Britain

[73] Assignee: Evode Holdings Limited, Stafford, Great Britain

[21] Appl. No.: 747,823

[22] Filed: Dec. 6, 1976

Related U.S. Application Data

[63] Continuation of Ser. No. 587,259, June 16, 1975.

[51] Int. Cl.$^2$ ............................................... C09J 7/02
[52] U.S. Cl. .......................... 428/355; 260/29.6 S; 260/29.7 S; 260/42.13; 428/262; 428/289; 428/308; 428/310; 428/446
[58] Field of Search ............... 428/260, 261, 262, 264, 428/265, 267, 289, 268, 290, 310, 306, 350, 308, 355, 356, 446; 260/42.13, 29.6 S, 29.7 S; 61/38

[56] References Cited

U.S. PATENT DOCUMENTS

| | | | |
|---|---|---|---|
| 984,121 | 2/1911 | Condie | 61/38 |
| 2,434,465 | 1/1948 | Marc | 428/446 |
| 2,662,064 | 12/1953 | Mead | 260/42.13 |
| 3,042,643 | 7/1962 | Foster | 260/42.13 |
| 3,301,799 | 1/1967 | Rothberg et al. | 260/29.6 S |
| 3,451,842 | 6/1969 | Kurz et al. | 260/2.5 |

FOREIGN PATENT DOCUMENTS

| | | | |
|---|---|---|---|
| 1,030,333 | 5/1966 | United Kingdom | 428/306 |

*Primary Examiner*—William J. Van Balen
*Attorney, Agent, or Firm*—Charles E. Pfund

[57] ABSTRACT

Water-activatible tapes are disclosed comprising a substrate of fibrous or foamed plastics material impregnated or coated with a water-reactive cementitious composition which is reactive with water to form a set mass, the composition containing at least one cement, especially Portland cement, a non-water sensitive polymeric binder, such as a natural or synthetic rubber, and a water-sensitive additive which is compatible with the polymeric binder and is sufficiently water-sensitive to at least swell in contact with water. The tapes are suitable for construction purposes, e.g. sealing joints in buildings or pipe-wrapping, by wetting with water to form a pliable mass which can be deformed to the desired shape and which will subsequently harden.

13 Claims, No Drawings

WATER ACTIVATABLE TAPES

This application is a continuation-in-part of Ser. No. 587,259, filed June 16, 1975.

BACKGROUND TO THE INVENTION

In the construction and allied industries a number of situations exist where joints, cracks or gaps require to be sealed or structures such as pipework must be protected against corrosion. It is often satisfactory to use permanently tacky adhesive tapes for many such purposes, for example, tapes coated or impregnated with adhesives based on bitumen.

The shortcomings of such adhesive tapes are however apparent when the building, pipe or other structure is subjected to extremes of heat or cold. Cement compositions exhibit excellent resistance to extreme conditions of heat and cold but being curable materials have heretofore been mixed with the gauging water and applied on site. One proposal to use a cement composition in this way using a glass fibre fabric as a reinforcement is described in British patent specification No. 714,756 to Stewart and Lloyds Ltd. In this prior patent the cement composition is mixed to a paste with water and spread over the glass fibre fabric. While such a procedure could be carried out e.g. in a pipe-manufacturing plant, it is not a very practical method of applying a protective covering to existing pipework.

SUMMARY OF THE INVENTION

A basic object of the present invention is to provide a cement based tape which can be activated by wetting with water just before use and in which the cement remains unified with the substrate of the tape at all times.

An additional object of the invention is to provide a tape in which an uncured cement is bound to the substrate and which is rendered mouldable and adhesive on wetting with water.

According to the present invention there is provided a water-activatible tape for construction purposes which comprises a substrate of fibrous or foamed plastics material impregnated or coated with a water-reactive cementitious composition including at least one cement and a non-water sensitive polymeric binder which binds the cement to the substrate while the tape is in its uncured state and a water-sensitive additive which is compatible with the polymeric binder and which is sufficiently water-sensitive to at least swell in contact with water.

The three basic components of the cementitious composition are all necessary in order to achieve a useful tape. Thus, we have found, for example, that if the water-sensitive additive is omitted, the cement will not be effectively activated by the water since the polymeric binder tends to encapsulate the particles of cement and prevents them from reacting with the water. By including in the composition an additive which is compatible with the binder and swells or dissolves in the gauging water, the layer of binder encapsulating the particles of cement is rendered sufficiently permeable to the water to enable the cement to be activated.

In the dry state of the tape the binder functions to bind the dry particles of cement to the substrate of the tape and prevent the cement from being washed off the substrate when the tape is activated with water.

Such binders are organic polymeric materials and are preferably natural or synthetic rubbers, e.g. nitrile rubber, polyurethanes, polychloroprene, styrene butadiene rubbers, epichlorhydrin rubber, natural and reclaimed rubber and synthetic polyisoprene, chlorinated polyisoprene, polyisobutylene, polybutadiene, butyl and chlorosulfonated polyethylene elastomers and graft polymers thereof. Other, non-rubbery polymers, useful as binders for the purposes of the present invention, include polyolefins, polyvinyl ethers, polyvinyl acetate, polyvinyl alcohol, polyvinyl butyrates, polyamides, polyacrylates, polymethacrylates, polystyrene, ABS, chlorinated PVC, polyvinylidene chloride, chlorinated natural rubber, polysulphide, silicones, polyesters, unsaturated polyesters, epoxide resins, bitumens and asphalts and drying oil based materials such as alkyd resins. Such polymers or copolymers may be used separately or in admixture with two or more polymers or additional modifying agents. Examples of suitable modifying agents include wood rosin and its derivatives, hydrocarbon resins, phenolic resins, coumarone and coumarone indene resins. In the dry tapes the binder also improves the flexibility and rub resistance.

Typical cements or cement mixes useful in the tapes of the present invention include Portland cement, white cement, Ciment Fondu, stearate coated cement or mixtures of such materials with inert diluents such as silica, clays, calcium carbonate, gypsum, talc, fluorspar, barytes, pulverised fly ash and metal oxides. The inert diluents may also act as pigments.

The substrate of the tape, i.e. the fibrous or foamed plastics material, is conveniently impregnated with the cementitious composition by treatment, e.g. by immersion, with a non-aqueous slurry containing the cement and other desired ingredients.

The third basic ingredient of the cement compositions in an additive which is compatible with the polymeric binder and which is sufficiently water sensitive to at least swell in contact with water. Polymers containing hydrophilic groups are generally suitable materials e.g. cellulose derivatives such as cellulose ethers and esters; homopolymers and copolymers of vinyl pyrrolidone, polyvinyl alcohols (preferably a cold water soluble grade), gelatine, starch gums, polyacrylates, polyhydroxy alkyl acrylates, polyvinyl ethers, polyalkylene glycols, polyoxy-alkylene glycols, polyacrylamides and alkali metal alginates. Certain non-polymeric materials which are hydrophilic in nature are also capable of being used as the additive, a specific example being silicate and water-swellable clays.

Water-sensitive additives which are suitable for the purposes of the present invention should be sufficiently compatible with the polymeric binder that on drying a film from a solution or dispersion containing the binder and the additive, the dried film contains the additive dispersed therein. It is not essential that the additive and the binder should be capable of forming a haze-free film, although it is desirable that the two components are capable of forming a dried, substantially continuous film. Water-sensitive additives which are film-forming are preferred.

While the aim in formulating the cement containing slurries for coating or impregnating the tape is to select a non-aqueous solvent or solvent blend in which the binder and the additive are both soluble, it is sufficient if one or both of these two components are dispersible in the continuous phase and do not form separate distinct phases.

The most preferred class of additives are cellulose ethers and esters, specifically methyl cellulose, hydroxy propyl cellulose and methyl hydroxy ethyl cellulose. Such cellulose derivatives are all readily swellable in contact with water and are soluble or dispersible in organic solvents, such as methylene chloride, which are also solvents for the elastomeric polymeric binders. Generally speaking, those cellulose ethers or esters which are more highly etherified or esterified are more readily soluble in organic solvents and are most preferred.

If desired a thickening agent may be incorporated in the cement/solvent slurry in order to improve the application properties of the slurry, e.g. for curtain coating, dip coating and impregnation or roller coating. Examples of suitable thickening agents are china clay, fumed silica and bentonites.

The fibrous material, when used as the substrate of the tape may consist of a woven or non-woven natural or synthetic fabric formed from material or synthetic fibres such as wool, cotton, asbestos, hessian (open-weave jute), glass fibres, polypropylene, nylon, polyester, acrylonitrile, cellulosic fibres, steel wool and mixtures thereof. The fibrous material may be preformed into a fabric or web or may be formed during the manufacturing process into a membrane by dispersing fibres of the desired type in the composition followed by depositing a coating from the composition onto a surface and subsequently stripping off the tape so formed.

Where the body of the tape is a foamed plastics material, the foamed material is preferably a web of polyurethane, polythene or p.v.c. foam.

The tapes in accordance with the invention are preferably formed by preparing a solution or dispersion of the water-sensitive additive in an organic solvent or solvent blend, e.g. a ketone, ester or aromatic or aliphatic hydrocarbon, a chlorinated hydrocarbon or an ether. The binder or binders are then added as a solution in the same organic solvent (or one compatible therewith) and the two solutions or dispersion and solution blended with stirring followed by mixing in the cement to form a slurry. The proportions of the solid ingredients to solvent are preferably such that a slurry of total solids content between 10 and 98 weight percent is obtained. The fibrous or foamed plastics material which is to form the substrate of the tape is then impregnated or coated with the resultant slurry, preferably by dip coating, and the solvent removed by forced evaporation, e.g. by passage through a tunnel dryer. The resulting tape can then be coiled or otherwise stored, if necessary with interleaving release material, until needed for use.

Water or an aqueous solution or emulsion may be used to activate the tape which can be wrapped or deformed into the desired shape, whereupon the cement will set to convert the tape to a solid mass. Preferably, the tape is wetted prior to application to the surface to be treated, although the reverse procedure is possible.

Some of the additive materials mentioned, e.g. the cellulose derivatives, possess the advantageous property of imparting a surface tack to the wetted tape which facilitates the application of the material to the surface to be sealed or protected. In other cases it may be desirable to include a tackifier such as a polyvinyl ether, e.g. polyvinyl methyl ether.

Foaming agents such as aluminium powder, metal carbides and azo compounds may be incorporated into the slurry to give a foamed structure before or after water activation. Additional substances may be added to the impregnated slurry to promote or retard the rate of cure of the cement e.g. sugars and alkali metal and alkaline earth metal salts. Stearic acid or other saturated or unsaturated fatty acids or esters and synthetic waxes can be incorporated in the slurry to act as a waterproofing aid in the final cured material.

When activating the tape, an aqueous solution may be employed which contains substances which promote or retard the rate of cure of the cement.

Examples of such substances are alcohols, sugars, solutions of alkali and alkaline earth metal salts (e.g. calcium chloride). The activating liquid may additionally or alternatively contain elastomers and resin emulsions having a total solids content of 1 to 50 weight percent to vary the properties of the set materials, especially to improve adhesion and flexibility and also to provide a water resistant barrier. Examples of such emulsions are latices of natural rubber, styrene-butadiene rubber, polychloroprene, nitrile rubber, polyvinyl acetate, acrylic, polyurethane, polystyrene and styrene/acrylates, vinyl acetate/acrylate, acrylonitrile/vinylidene chloride and ethylene/vinyl acetate copolymers, and bitumens. Such resin emulsions may be modified by addition of wood rosin derivatives, hydrocarbon resins, phenolic resins, resoles, coumarone or coumarone indene resins or mixtures of these resins dispersed in an aqueous medium.

In the manufacture of tapes in accordance with the invention we currently prefer to use Portland cement as the water-reactive cementitious substance, a cellulose ether as the additive and styrene-butadiene rubber as the polymeric binder. Preferred compositions for the impregnating slurry are Portland cement 50-150 parts by weight, cellulose ether up to 20 parts by weight, e.g. 1 to 20 parts, styrene-butadiene rubber or other rubber up to 10 parts by weight, e.g. 0.5 to 10 parts and other additives up to 10 parts by weight.

Preferably the cementitious composition is applied to the tape in an amount of from 0.2 to 10 kgs per square meter (dry basis) of the fibrous or foamed plastics substrate material.

Possible uses for tapes prepared in accordance with the invention include repair of cracks in building structures waterproof coatings, construction of seamless concrete pipes, road markings, flashings, lining concrete moulds, as bonding agents, e.g. as tile adhesives, making spirally wound containers, as grout loss sealers, protecting steel work including pipes, self-adhesive tiles, light weight prefabrications, temparory water barriers, fire-resistant protective coatings for insulation or for protecting steel work, corrosion resistant coatings for steel, repairing spalled concrete forming pool liners and wrapping asbestos insulation to prevent escape of asbestos fibres into the atmosphere.

DETAILED DESCRIPTION OF THE INVENTION

The following Examples are given to illustrate the invention and the manner in which it may be carried into effect.

EXAMPLE 1

85 parts by weight of Portland cement was slurried in a low boiling point ketone solvent with 5 parts by weight of methyl cellulose. One part by weight of nitrile rubber was then added to the dispersion to achieve a total solids content of about 75 mass percent and a viscosity of 190-230 measured on a Universal Torsion Viscometer at 20°-25° C using a ½ inch cylinder and a 26 s.w.g. torsion wire. A tape was formed by dip coating a web of hessian into the resulting slurry. The web of hessian was drawn through a tank containing the slurry and at the exit from the tank the thickness of the coating was doctored to 0.04 inch. On exit from the coating tank, the hessian web was passed directly through a tunnel dryer at about 100° C and coiled.

On activating the tape by dipping it in water, the tape becomes plastic so that it can be moulded with the fingers and is adhesive towards a variety of surfaces. At normal ambient temperatures, the tape will convert overnight to a hard, set condition. The rate of water loss may be retarded by covering the surface with a film such as plyethylene. This increases the quality of the resultant cured tape. The dry cement tape, after hardening, may be coated with a suitable paint or protective coating. A decorative effect can be obtained by embedding grits, decorative sands, flakes, powders or pigments into the wet uncured tape.

EXAMPLE 2

Example 1 was repeated following substantially the same procedure except that the slurry used in each case was replaced by the following composition, in which parts are all by weight:

|  | Parts |
| --- | --- |
| Portland Cement | 550.4 |
| Thermoplastic rubber (styrene /butadiene - Solprene 415 - obtainable from Phillips Petroleum - binder | 5.5 |
| Polyvinyl methyl ether (Lutanol M40 - BASF) adhesion promoter. | 16.5 |
| Hydroxy propyl cellulose (celacol MMPRI - British Celanese) - water sensitive additive. | 27.5 |
| Methylene chloride (solvent) | 400.1 |

The procedure for preparing the slurry as described in Example 1 was modified as follows. The solvent was divided into two portions and the Solprene 415 was dissolved in one portion, while the Lutanol and the Celacol was dissolved in the other portion. A slurry was formed by blending the two solutions, followed by stirring in the cement.

EXAMPLE 3

The procedure described in Example 2 was repeated using the following ingredients the sand being added with the cement:

|  | Parts |
| --- | --- |
| Ciment Fondu (Lafarge) | 450 |
| Sand - filler | 450 |
| Nitrile rubber (Breon 1001 - B.P. Plastics Ltd) - binder | 7.5 |
| Methyl cellulose (Celacol HPM 15,000) - water sensitive additive. | 30 |
| Methyl ethyl ketone (solvent) | 650 |

In the following three Examples the procedure of Example 2 was used with the ingredients specified below:

EXAMPLE 4

|  | |
| --- | --- |
| Portland cement | 850 |
| Polyurethane rubber (Desmocoll 420 - Bayer) - binder | 15 |

-continued

|  | |
| --- | --- |
| Methyl hydroxy ethyl cellulose (Tylose MHB 1000) - water sensitive additive. Hoechst A.G. | 30 |
| Methylene chloride (solvent) | 650 |

EXAMPLE 5

|  |  | |
| --- | --- | --- |
| Portland cement |  | 850 |
| Styrene/butadiene rubber (Kryflex 1570 - Polysar) - binder |  | 12 |
| Sodium silicate | Water sensitive additives | 40 |
| Sodium carboxy methyl cellulose (Courlose A600) | | 20 |
| Toluene - solvent | | 675 |

The sodium silicate and the sodium carboxy methyl cellulose were added together to one portion of the solvent and the Kryflex to the other.

EXAMPLE 6

|  | Parts |
| --- | --- |
| Portland cement | 650 |
| Styrene/butadiene rubber (Kryflex 1570) - binder | 17 |
| Glass microspheres (Fillite Ltd) - filler | 200 |
| Synthetic clay (Laponite B - Laporte Chemicals Ltd) - water sensitive additive | 20 |
| Methylene chloride (Solvent) | 570 |

We claim:

1. A water-activatible tape for construction purposes which comprises a substrate of fibrous or foamed plastics material impregnated or coated with a water-reactive cementitious composition which is reactive with water to form a set mass, said cementitious composition including at least one cement and a non-water sensitive polymeric binder which binds the cement to the substrate while the tape is in its uncured state and a water-sensitive additive which is compatible with the polymeric binder and which is sufficiently water-sensitive to at least swell in contact with water.

2. A tape according to claim 1 in which the cement is Portland cement or a mixture thereof with a filler or diluent.

3. A tape according to claim 1 in which the polymeric binder is an elastomeric polymer selected from styrene-butadiene rubbers, nitrile rubbers, polyurethane rubbers, polychloroprene rubbers, natural rubbers, epichlorhydrin rubbers, synthetic polyisoprenes, chlorinated polyisoprenes, polyisobutylenes, polybutadienes, butyl and chlorosulfonated polyethylene elastomers and chlorinated natural rubber and blends thereof.

4. A tape according to claim 3 in which the water-sensitive additive is a film-forming material capable of enhancing the adhesion of the tape to a surface.

5. A tape according to claim 4 in which the additive is a cellulose derivative.

6. A water-activatible tape which comprises a woven or non-woven fabric which has been impregnated or coated with a non-aqueous cementitious slurry comprising a cement, a non-water-sensitive polymeric binder, an organic solvent for said binder and a water swellable or water-soluble additive dissolved or dispersed in the organic solvent and which has been dried to remove the solvent, said tape being reactive with water to form a hard, cured mass.

7. A tape according to claim 6 in which the slurry has a solids content between 10 and 98% by weight.

8. A tape according to claim 6 in which the polymeric binder is a natural or synthetic rubber.

9. A tape according to claim 6 in which the additive is methyl cellulose, hydroxy propyl cellulose, sodium carboxy methyl cellulose, methyl hydroxy ethyl cellulose, hydroxy ethyl cellulose, polyvinyl pyrrolidone or a polyvinyl alcohol.

10. A tape according to claim 6 which is impregnated or coated with the cementitious composition in an amount of from 0.2 to 10 kgs per square meter, calculated on a dry basis.

11. A tape according to claim 6 in which the fabric is impregnated or coated with a cementitious composition comprising 50 to 150 parts by weight of a cement, 1 to 20 parts by weight of a cellulose either and 0.5 to 10 parts by weight of a synthetic rubber.

12. A tape according to claim 6 in which the slurry contains a polyvinyl alkyl ether tackifying agent.

13. A water-activatible tape for construction purposes which comprises a fabric web coated and impregnated with a cementitious composition, said composition comprising at least one cement, an elastomeric polymer binder and a film-forming water-sensitive additive which is compatible with the binder and is swellable or soluble in water, said binder and said additive effectively binding the cement to the fabric while the tape is dry and said binder being effective to substantially prevent the cement being washed off the tape with water when activating the tape.

* * * * *